United States Patent
Ly

(10) Patent No.: US 8,519,294 B2
(45) Date of Patent: Aug. 27, 2013

(54) ELECTRIC DISCHARGE MACHINING WIRE WITH OPTIMIZED SURFACE COATING

(75) Inventor: Michel Ly, Annecy (FR)

(73) Assignee: Thermocompact, Metz Tessy (FR)

( * ) Notice: Subject to any disclaimer, the term of this patent is extended or adjusted under 35 U.S.C. 154(b) by 2127 days.

(21) Appl. No.: 10/332,672

(22) PCT Filed: Jul. 6, 2001

(86) PCT No.: PCT/FR01/02173
§ 371 (c)(1),
(2), (4) Date: Jan. 10, 2003

(87) PCT Pub. No.: WO02/05998
PCT Pub. Date: Jan. 24, 2002

(65) Prior Publication Data
US 2003/0155331 A1    Aug. 21, 2003

(30) Foreign Application Priority Data

Jul. 13, 2000  (FR) ..................... 00/09435

(51) Int. Cl.
*B23H 7/00*    (2006.01)

(52) U.S. Cl.
USPC ..................... 219/69.12; 219/69.11

(58) Field of Classification Search
USPC .................. 219/69.12, 69.11; 72/47
See application file for complete search history.

(56) References Cited

U.S. PATENT DOCUMENTS

| | | | | |
|---|---|---|---|---|
| 4,287,404 | A | | 9/1981 | Convers et al. ............... 219/69 |
| 4,686,153 | A | * | 8/1987 | Tominaga et al. ............ 428/610 |
| 4,717,804 | A | * | 1/1988 | Tomalin ...................... 219/69.12 |
| 4,806,721 | A | * | 2/1989 | Ito et al. ...................... 219/69.12 |
| 4,839,487 | A | * | 6/1989 | Ito et al. ...................... 219/69.12 |
| 4,977,303 | A | * | 12/1990 | Briffod ........................ 219/69.12 |
| 5,196,665 | A | * | 3/1993 | Briffod ........................ 219/69.12 |
| 5,599,633 | A | * | 2/1997 | Miyazaki et al. ............ 428/675 |
| 5,808,262 | A | * | 9/1998 | Mukherjee ................. 219/69.12 |
| 6,130,395 | A | * | 10/2000 | Kaneko et al. ............. 219/69.12 |
| 6,291,790 | B1 | * | 9/2001 | Nakai et al. ................ 219/69.12 |
| 6,306,523 | B1 | * | 10/2001 | Seong ......................... 428/613 |

FOREIGN PATENT DOCUMENTS

| | | |
|---|---|---|
| EP | 0 185 492 A2 | 6/1986 |
| EP | 0 521 569 A1 | 1/1993 |
| EP | 799665 A1 * | 10/1997 |
| FR | 2 418 699 | 9/1979 |
| JP | S62 213924 A | 9/1987 |

* cited by examiner

Primary Examiner — Alexandra Elve
(74) Attorney, Agent, or Firm — RatnerPrestia

(57) ABSTRACT

The invention concerns an electrode wire comprising a metal core coated with a zinc surface cladding whereof the thickness ranges between 2 and 4 μm, thereby providing a better compromise between machining speed, precision of workpieces and surface condition of the machined workpieces.

3 Claims, 2 Drawing Sheets

ELECTRIC DISCHARGE MACHINING WIRE WITH OPTIMIZED SURFACE COATING

This application is the U.S. national phase application of PCT International Application No. PCT/FR01/02173 filed Jul. 6, 2001.

TECHNICAL FIELD OF THE INVENTION

The present invention relates to electrode wires for spark erosion machining.

Spark erosion is used to machine an electrically conductive part, by generating sparks between the part to be machined and an electrically conductive wire. The electrically conductive wire is moved in the lengthwise direction of the wire in the vicinity of the part, and is moved progressively in the transverse direction relative to the part either by moving the wire in translation or by moving the part in translation.

The sparks progressively erode the part and the wire. The longitudinal movement of the wire maintains at all times a wire diameter sufficient to prevent its breaking in the sparking area. The relative movement of the wire and the part in the transverse direction enables the part to be cut or its surface to be treated, if necessary.

Wire spark erosion machines include means for holding and tensioning a length of wire in the vicinity of the part to be machined in a sparking area filled with a dielectric such as water, means for moving the wire longitudinally in the sparking area, means for generating a sparking current between the wire and the part to be machined, and means for producing relative movement of the wire and the part transversely to the longitudinal direction of the wire.

Spark erosion machining is generally effected in a succession of steps. During a first step, high energy sparks are generated in the machining area, for fast cutting of the part to confer on it substantially its final dimensions. During a second step, moderate energy sparks are generated in the sparking area, and a second pass is carried out to correct the geometry of the part and thus to eliminate geometry defects caused by the high energy sparks during the first step. An additional step at moderate energy may be necessary to correct the geometry further. During a third finishing step, low energy sparks are generated in the sparking area and a finishing pass is carried out during which the means for producing relative transverse movement of the wire and the part track the already cut shape of the part, and the low energy sparks thus correct the roughness of the part.

Many types of spark erosion wire are currently available, and can be divided into two main families.

In the first family, the wires have a generally homogeneous transverse structure, consisting of copper, brass, tungsten or molybdenum, for example. The alloy chosen must satisfy electrical conductivity and mechanical strength requirements. Conductivity is required to feed energy into the sparking area. Mechanical strength is required to prevent the wire from breaking in the sparking area. If possible, the alloy is chosen so that the wire exhibits a behavior favorable to erosion, that is to say so that the wire enables erosion to be carried out at high speed. The maximum erosion speed of a wire is the speed limit beyond which the wire breaks if the sparking energy is increased to accelerate erosion.

Another important parameter is the conformity of the machined part in terms of its accuracy and surface state.

As a general rule, each wire structure confers a machining speed, a machining accuracy and a surface state.

It is difficult to find an alloy that optimizes the machining speed, machining accuracy and surface state parameters simultaneously. Brass wires have been thus proposed containing 35% to 37% of zinc, and this constitutes an economically acceptable compromise, but is achieved at the cost of a relatively low erosion speed.

The second family of spark erosion wires comprises coated wires, that is to say wires consisting of a metal core covered with a usually homogeneous metal or alloy surface layer. During wire spark erosion machining, the electrical arc thus struck between the surface of the wire and the surface of the part, through the dielectric such as water, does not reach the center of the wire, which would otherwise break. It is the coating of the wire that is worn away.

The benefit of coated wires is that the core of the wire can be chosen for its electrical and mechanical properties, and the coating can be chosen for its erosive and contact resistance properties.

The document FR 2 418 699 thus proposes coating the core with an alloy of zinc, cadmium, tin, lead, bismuth or antimony. It teaches that the coating improves the machining speed. The examples teach a coating approximately 15 μm thick.

However, it is found that the above kind of spark erosion wire cannot achieve satisfactory machining accuracy and a satisfactory surface state at the same time.

The document EP 0 185 492 describes an electrode wire whose core is covered with a layer of a hot-diffused alloy of copper and zinc 0.1 μm to 15 μm thick containing from 10% to 50% of zinc. Fabrication involves a complex process including many process steps. The document does not teach how to obtain a good surface state on the part to be machined by the electrode wire. The machining accuracy aimed for and achieved is of the order of 10 μm, which is inadequate for present-day requirements.

The document EP 0 521 569 teaches to manufacture an electrode wire by electrolytic deposition onto a metal core, and wire drawing. Codeposition of two or more metals to a thickness from 10 μm to 20 μm prevents scaling of the surface layer. Fabrication involves a complex process including many process steps, including a codeposition step in which the relative proportions of the metals must be strictly controlled. And the document does not teach how to obtain a good surface state on the part to be machined by the electrode wire.

The document JP 62 213924 A describes an electrode wire having a core coated with 0.5 μm to 4 μm of zinc or zinc alloy. A smooth interface is necessarily provided between the core and the coating to obtain a good surface state of the part to be machined. Producing the smooth interface increases the cost of manufacturing the electrode wire.

The present invention is the result of research into optimizing the structure of a spark erosion wire to combine fast erosion, very accurate machining, and reduced electrode wire manufacturing cost.

To reduce the manufacturing cost, the invention starts from the idea that a wire with a surface layer of non-diffused zinc is simpler to produce on an industrial scale. There is no need to monitor and to adapt the concentration of metals in the zinc bath, and the metal lends itself well to wire drawing and final sizing operations.

It was first observed, confirming the teaching of the document FR 2 418 699, that increasing the thickness of a zinc coating accelerates spark erosion.

A second, and surprising, observation was that, on some spark erosion machines, obtaining a fine surface state compromises the geometrical accuracy of the parts, for the same wire, but that the geometrical accuracy of the parts can be significantly improved by a judicious choice of the thickness of the zinc coating.

It was also found that using an electrode wire with a continuous nonoxidized zinc coating significantly improves the surface state of the machined part.

SUMMARY OF THE INVENTION

Thus, the problem addressed by the present invention is first to design a new electrode wire structure for spark erosion machining that optimizes the machining speed and machining accuracy parameters, and reduces the cost of manufacturing the electrode wire.

Another object of the invention is to propose an economical method of manufacturing the above kind of electrode wire, and a machining method that optimizes the parameters previously cited.

The invention preferably also aims to improve the surface state of the machined part.

To achieve the above and other objects, the invention provides an electrode wire for spark erosion machining, comprising a metal core coated with a surface layer of zinc, wherein the thickness of the surface layer of zinc is from 2 µm to 4 µm. It is particularly easy and inexpensive to produce the zinc layer, because there is no need to control its composition, which is not the case with prior art wires manufactured by codeposition of a plurality of metals and/or thermal diffusion.

In the context of the invention, the expression "surface zinc layer" means a layer of pure zinc in the compact hexagonal or terminal solid solution phase, or an alloy containing at least 90% by weight of zinc.

The thickness of the surface layer can advantageously be chosen and varied as a function of the total diameter of the wire. Accordingly, for an outside wire diameter from approximately 0.25 mm to approximately 0.30 mm, the thickness of the surface layer can advantageously be from 3 µm to 4 µm. On the other hand, for an outside wire diameter of less than 0.25 mm, the thickness of the surface layer can advantageously be from approximately 2 µm to approximately 3 µm.

Choosing this range of thicknesses has the surprising advantage of solving the problem addressed by the invention.

The surface layer is preferably continuous, in other words does not expose the core of the wire. This improves the reproducibility of the sparks in the sparking area, stabilizes the process, and makes the machined surface more regular.

A surface layer substantially free of oxidized surface areas and consequently having a bright metallic appearance guarantees good electrical contact between the electrode wire and the part, which influences the accuracy of the automatic detection of the position of the part to be machined relative to the axis of the wire during the finishing step. This also guarantees good electrical contact between the electrode wire and the sparking current generator. That improves the surface state of the part.

According to the invention, an electrode wire as defined above can advantageously be used for a method of machining a part by spark erosion. This method includes a step of finishing the part in which the electrode wire having a surface layer having a thickness from 2 µm to 4 µm is moved progressively to track the contour of the part and to correct its roughness.

The manufacture of an electrode wire in accordance with the invention can comprise the following steps:
  a. producing a temporary coating of appropriate thickness by electrolytically depositing zinc onto a metal core blank,
  b. by successive drawing and annealing operations, reducing the diameter of the wire to its final value, the appropriate thickness of the temporary coating and the appropriate diameter of the core blank being chosen such that, after drawing, the wire has the required total diameter and a final surface layer thickness from approximately 2 µm to approximately 4 µm.

BRIEF DESCRIPTION OF THE DRAWINGS

Other objectives, features and advantages of the present invention will emerge from the following description of particular embodiments, which is given with reference to the accompanying drawings, in which.

DESCRIPTION OF PREFERRED EMBODIMENT

Figure 1:
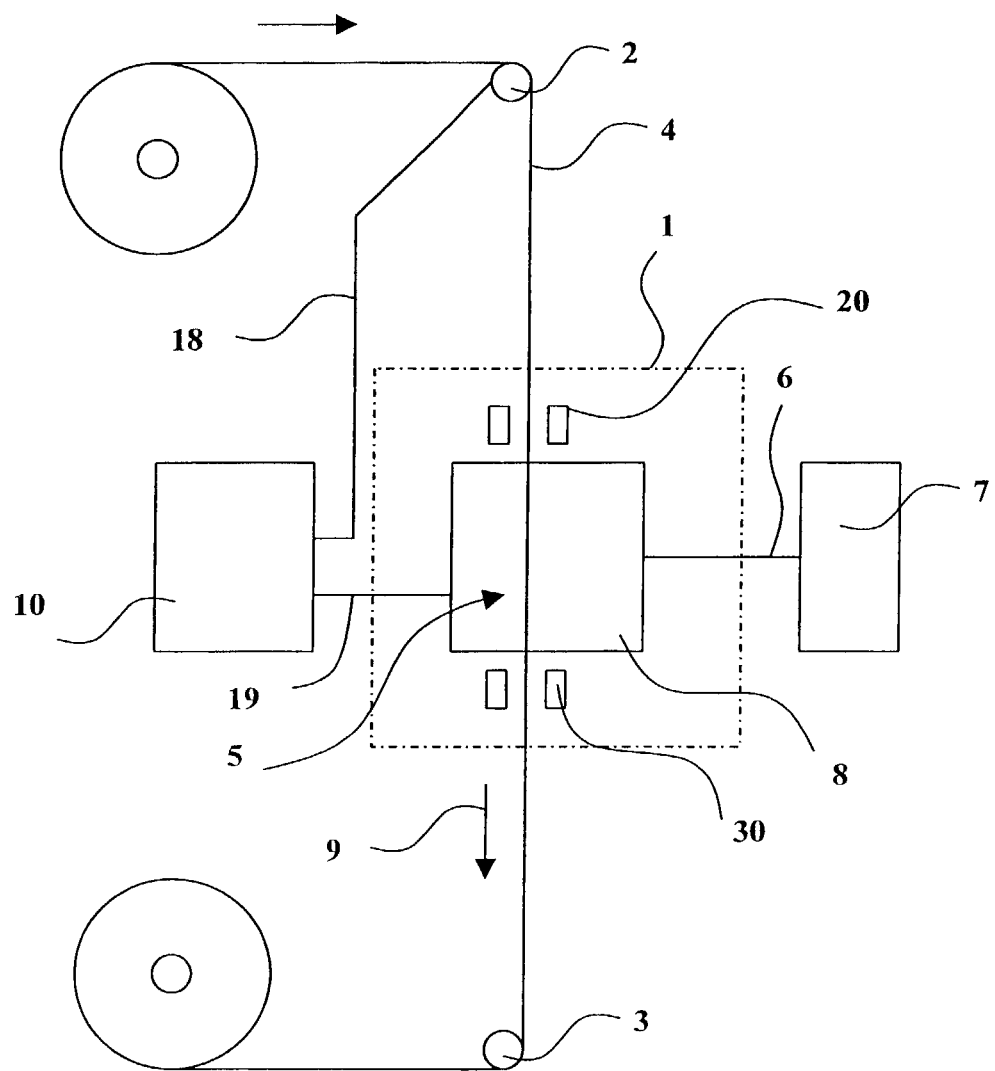
FIG. 1 is a diagrammatic front view of a spark erosion machine.
Figure 2:
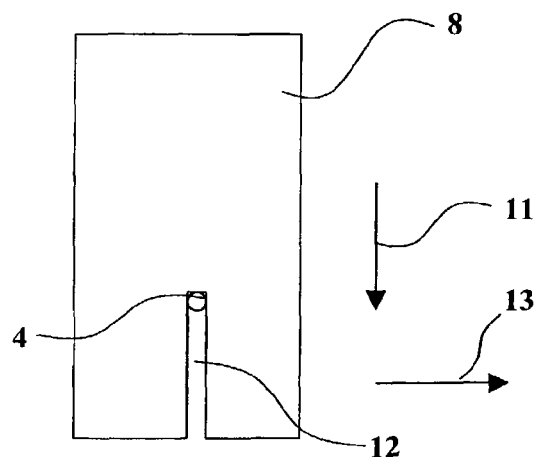
FIG. 2 is a plan view showing the spark erosion method used by the machine from FIG. 1.
Figure 3:
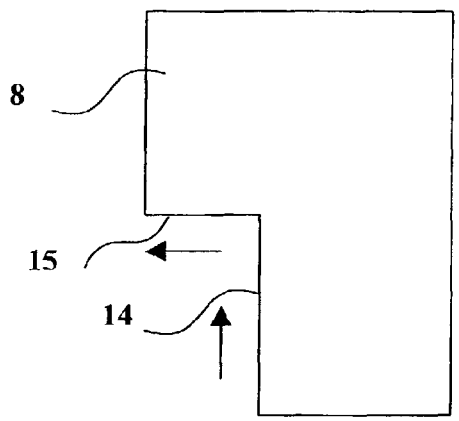
FIG. 3 is a plan view of a machined part from FIGS. 1 and 2.

Consider first of all FIGS. 1 to 3, which show a spark erosion machining method using a wire. The spark erosion machine shown in FIG. 1 essentially comprises a machining enclosure 1 containing a dielectric such as water, means such as pulleys 2 and 3 and wire guides 20 and 30 for holding an electrode wire 4 and tensioning it in a sparking area 5 inside the enclosure 1, a part support 6 and means 7 for moving the part support 6 relative to the electrode wire 4 in the sparking area 5. The part 8 to be machined, held by the part support 6, is placed in the sparking area 5. The wire guides 20, 30 are on respective opposite sides of the part 8 to be machined, and accurately guide the electrode wire 4. For this reason they are positioned close to the part 8 to be machined, and their diameter is slightly greater than that of the electrode wire 4; for example, they have a diameter of 254 µm for an electrode wire 4 having a diameter of 250 µm. The electrode wire 4 moves longitudinally past the part 8 to be machined in the sparking area 5, as indicated by the arrow 9. An electrical generator 10, electrically connected to the electrode wire 4 by a line 18 and by the electrically conductive pulley 2, and to the part 8 to be machined by a line 19, generates in the sparking area 5 appropriate electrical energy causing electrical arcs to be struck between the part 8 to be machined and the electrode wire 4.

The machine includes control means for adapting as a function of the machining step the electrical energy, the speed at which the electrode wire 4 moves, and the movement of the part 8 to be machined.

As can be seen in FIG. 2, by moving the part to be machined in a transverse direction shown by the arrow 11, the erosive sparks cause the electrode wire 4 to penetrate progressively into the mass of the part 8 to be machined, which is electrically conductive, and produce a slot 12. Then, by moving the part 8 to be machined in the direction of the arrow 13, a perpendicular cut is produced, to obtain a final part as shown in FIG. 3, with a first machined facet 14 and a second machined facet 15.

Clearly, if the electrical generator 10 generates a high electrical energy, sparking can be faster and thus the part to be machined can be moved faster relative to the electrode wire 4, achieving fast machining. However, because the erosive sparks are generated discontinuously, increasing the speed of movement affects the geometrical accuracy of the machined part, and affects the surface state of the machined facets 14 and 15.

Figure 4:
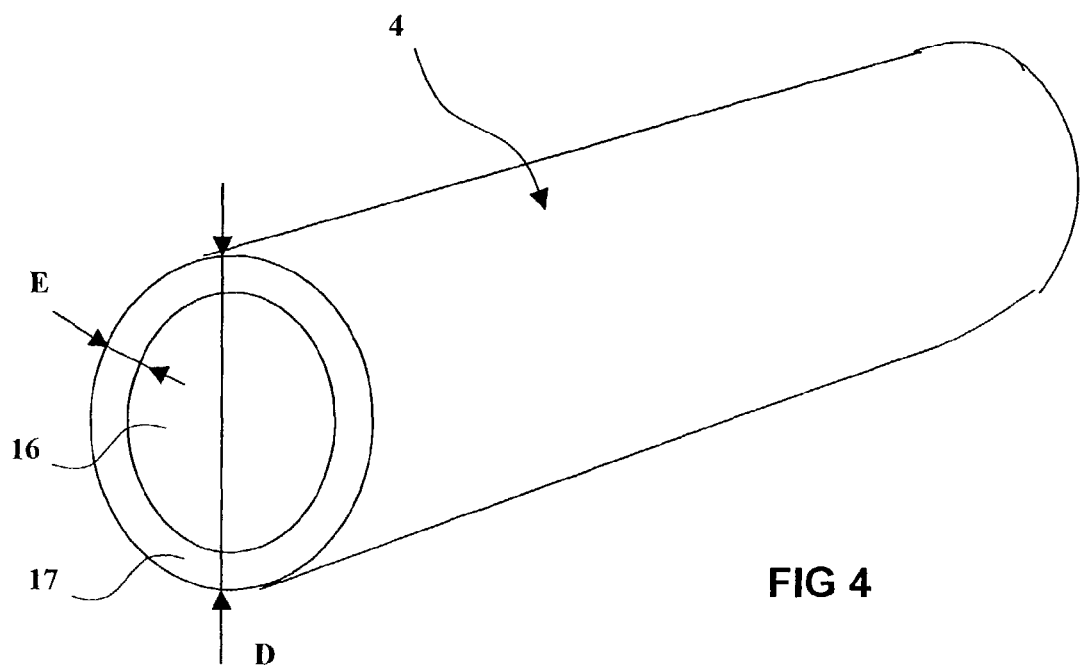
FIG. 4 is a diagrammatic perspective view to a larger scale of one embodiment of an electrode wire according to the present invention.

In accordance with the invention, a better compromise can be obtained by using a particular electrode wire, which is shown to a larger scale in FIG. 4. The electrode wire according to the invention comprises a metal core 16 whose composition is chosen as a function of the required mechanical and electrical properties of the electrode wire 4. For example, an iron core can be used to increase the tensile strength of the electrode wire 4, or a nickel or nickel alloy core, a copper core, or a brass core. How to make the choice will be evident to the person skilled in the art. The metal core 16 is coated with a surface layer 17 of zinc whose thickness E is from 2 μm to 4 μm. The accuracy of the parts 8 to be machined is reduced if the thickness of the surface layer is greater than 4 μm. For example, for a steel part 50 mm high, a surface layer thickness of 7 μm can lead to a dimensional error in the part from approximately 4 μm to approximately 6 μm, whereas a surface layer thickness less than or equal to 4 μm will lead to a dimensional error of only 1 μm to 2 μm. Below 4 μm, the accuracy of the parts is virtually not affected by the thickness of the surface layer.

Then, the machining speed being an increasing function of the surface layer thickness, there is no benefit in reducing the thickness below the satisfactory range.

For this reason, in accordance with the invention, a surface layer thickness from 2 μm to 4 μm is advantageously chosen.

This thickness can be adapted to the outside diameter of the wire. For a wire whose outside diameter D is from approximately 0.25 mm to approximately 0.30 mm, the thickness E of the surface layer 17 can be from 3 μm to 4 μm. For a wire whose outside diameter D is less than 0.25 mm, the thickness E of the surface layer 17 can be from approximately 2 μm to approximately 3 μm.

The surface layer 17 is preferably continuous, as shown in FIG. 4; in other words its lateral surface does not expose the metal core 16 of the wire.

The surface layer 17 is preferably substantially free of oxidized surface areas, and consequently has a bright metal appearance.

In this regard, it has been found that the presence of electrode wire surface irregularities, or a surface oxide layer, causes irregular sparking, especially during finishing steps when machining at low power. This results in a machined part surface state for which the roughness Ra is generally greater than 0.28 μm. On the other hand, with a nonoxidized wire and a regular zinc layer, it has been possible to obtain a machined part surface state whose roughness Ra is less than 0.18 μm, or even as low as 0.14 μm if the generator of the spark erosion machine is optimized.

A method comprising the following steps can advantageously be used to manufacture an electrode wire in accordance with the invention of the above kind:

a. producing a temporary coating of zinc with an appropriate thickness by electrolytic deposition onto a metal core blank of appropriate diameter; the appropriate thickness of the temporary coating is greater than the thickness of the final surface coating to be obtained; similarly, the appropriate diameter of the metal core is greater than the final diameter of the core in the wire to be obtained; and then b. by means of successive drawing and annealing operations, reducing the wire to the final diameter and obtaining the required mechanical properties, such as ultimate tensile strength, elongation at the ultimate tensile strength, straightness. To prevent the formation of oxides, the annealing steps are of short duration or carried out in a neutral atmosphere.

Thus, the appropriate temporary coating thickness is chosen so that, after drawing, the thickness E of the final surface layer 17 is from approximately 2 μm to approximately 4 μm. Similarly, the appropriate diameter of the core blank is chosen so that, after drawing, the diameter of the core is such that the total diameter D of the wire is the required total diameter.

The invention teaches using an electrode wire as defined hereinabove to machine a part by spark erosion. During such machining, a part finishing step is carried out during which wire having a surface layer 17 with a thickness E from 2 μm to 4 μm is moved progressively to track the contour of the part and to correct its roughness. Using a wire whose surface zinc layer 17 has a continuous thickness from approximately 2 μm to approximately 4 μm and is substantially free of oxides represents the best compromise between machining speed, the accuracy of the parts and their surface state.

The present invention is not limited to the embodiments explicitly described, but encompasses variants and generalizations thereof within the scope of the following claims.

The invention claimed is:

1. An electrode wire for spark erosion machining comprising a metal core coated with a surface layer of zinc, wherein the thickness of the surface layer of zinc is from approximately 2 μm to approximately 4 μm and the zinc layer comprises at least 90% by weight zinc, wherein for an outside wire diameter from approximately 0.25 mm to approximately 0.30 mm, the thickness of the surface layer of zinc is from 3 μm to 4 μm.

2. A method of machining a part by spark erosion, the method comprising a step of finishing the part to be machined in which an electrode wire is moved progressively to track the contour of the part to be machined and to correct its roughness; wherein: the electrode wire comprises a metal core coated with a surface layer of zinc, the thickness of the surface layer of zinc is from approximately 2 μm to approximately 4 μm, and the zinc layer comprises at least 90% by weight zinc, wherein for an outside diameter from approximately 0.25 mm to approximately 0.30 mm, the thickness of the surface layer of zinc is from 3 μm to 4 μm.

3. A method of manufacturing a wire, which method comprises the following steps: a. producing a temporary coating of zinc of appropriate thickness by electrolytic deposition onto a metal core blank of appropriate diameter; and b. by successive drawing and annealing operations, reducing the diameter of the wire to its final value, the appropriate thickness of the temporary coating and the appropriate diameter of the core blank being chosen so that, after drawing, the wire has the required total diameter and a thickness of the final surface layer of zinc from approximately 2 μm to approximately 4 μm and the zinc layer comprises at least 90% by weight zinc, wherein the surface layer of zinc is continuous, so that it does not expose the metal core of the wire, wherein the surface layer of zinc is substantially free of oxidized surface areas, and consequently has a bright metallic appearance, wherein for an outside wire diameter from approximately 0.25 mm to approximately 0.30 mm, the thickness of the surface layer of zinc is from 3 μm to 4 μm.

* * * * *